(12) United States Patent
Hobe et al.

(10) Patent No.: US 9,663,163 B2
(45) Date of Patent: May 30, 2017

(54) ROAD WHEEL (71) Applicant: Hutchinson SA, Paris (FR)

(72) Inventors: Peter Hobe, Levittown, PA (US); Aysel Poyrazli, Levittown, PA (US); Lars Johan Resare, Ewing, NJ (US)

(73) Assignee: HUTCHINSON SA, Paris (FR)

( * ) Notice: Subject to any disclaimer, the term of this patent is extended or adjusted under 35 U.S.C. 154(b) by 39 days.

(21) Appl. No.: 14/670,919

(22) Filed: Mar. 27, 2015

(65) Prior Publication Data

US 2015/0314817 A1 Nov. 5, 2015

Related U.S. Application Data (60) Provisional application No. 61/973,615, filed on Apr. 1, 2014.

(51) Int. Cl.
| | |
|---|---|
| *B62D 55/14* | (2006.01) |
| *B62D 55/15* | (2006.01) |
| *B62D 55/088* | (2006.01) |
| *B60B 11/02* | (2006.01) |
| *B60B 21/02* | (2006.01) |

(52) U.S. Cl.
CPC ........... *B62D 55/15* (2013.01); *B62D 55/088* (2013.01); *B62D 55/145* (2013.01); *B60B 11/02* (2013.01); *B60B 21/021* (2013.01); *B60B 2900/311* (2013.01); *B60Y 2200/25* (2013.01)

(58) Field of Classification Search
CPC .............................. B62D 55/145; B62D 55/15
USPC ................. 305/136, 142, 129, 130
See application file for complete search history.

(56) References Cited

U.S. PATENT DOCUMENTS

| 2,338,818 | A | | 1/1944 | Mayne et al. | |
|---|---|---|---|---|---|
| 2,984,524 | A | * | 5/1961 | Franzen | B62D 55/14 305/194 |
| 3,603,650 | A | | 9/1971 | Miller | |
| 3,606,497 | A | | 9/1971 | Gilles et al. | |
| 3,979,154 | A | * | 9/1976 | Groff | B60B 3/12 301/6.91 |
| 3,993,356 | A | * | 11/1976 | Groff | B60B 3/08 301/6.91 |
| 3,997,217 | A | * | 12/1976 | Bandet | B60B 3/06 301/5.1 |
| 4,069,856 | A | * | 1/1978 | Sogge | B62D 55/0963 152/27 |

(Continued)

FOREIGN PATENT DOCUMENTS

| FR | 1393425 | 3/1965 |
|---|---|---|
| GB | 199373 | 1/1924 |

OTHER PUBLICATIONS

PCT International Search Report in PCT/EP2015/056909, mailed Sep. 25, 2015, 7 pages.

(Continued)

*Primary Examiner* — Jeffrey J Restifo (74) *Attorney, Agent, or Firm* — Servilla Whitney LLC (57) ABSTRACT

The presently claimed invention relates to a road wheel comprising a mounting disc, a dish-shaped transitional wall having an outer edge, a rim with an annular cylindrical wall attached along a first rim edge to the outer edge of the transitional wall, and a stiffening flange attached to the rim along a second rim edge opposite the first rim edge wherein the flange provides radial support to the second rim edge of the cylindrical wall to resist deflection.

20 Claims, 11 Drawing Sheets

(56) References Cited

U.S. PATENT DOCUMENTS

| | | | |
|---|---|---|---|
| RE30,039 E * | 6/1979 | Clemens | B60B 3/02 305/136 |
| 4,425,008 A * | 1/1984 | Weeks | B62D 55/14 305/137 |
| 4,444,435 A | 4/1984 | Honsa | |
| 4,449,756 A * | 5/1984 | Weeks | B62D 55/14 301/37.42 |
| 4,696,520 A | 9/1987 | Henke et al. | |
| 4,818,041 A * | 4/1989 | Oertley | B62D 55/145 295/20 |
| 4,870,736 A | 10/1989 | Kacalieff | |
| RE34,909 E * | 4/1995 | Kindel | B60B 3/005 152/12 |
| 6,012,784 A * | 1/2000 | Oertley | B60B 17/0034 305/136 |
| 6,062,662 A * | 5/2000 | Witt | B62D 49/0635 305/125 |
| 6,086,169 A * | 7/2000 | Keehner | B62D 55/14 305/137 |
| 6,129,426 A * | 10/2000 | Tucker | B62D 55/065 305/136 |
| 6,299,264 B1 | 10/2001 | Kautsch et al. | |
| 6,631,961 B1 * | 10/2003 | Bedford | B62D 55/145 305/100 |
| 7,137,675 B1 | 11/2006 | Simula et al. | |
| 8,783,795 B2 * | 7/2014 | Brazier | B62D 55/12 180/9.1 |
| 9,033,431 B1 * | 5/2015 | Zuchoski | B62D 55/14 305/130 |
| D762,140 S * | 7/2016 | Simula | D12/12 |
| 2011/0298271 A1 | 12/2011 | Cragg | |
| 2012/0001478 A1 | 1/2012 | Zuchoski et al. | |
| 2012/0146394 A1 | 6/2012 | Simula | |
| 2012/0153712 A1 * | 6/2012 | Simula | B62D 55/14 305/136 |
| 2012/0228926 A1 * | 9/2012 | Bair | B62D 55/14 305/136 |
| 2013/0140875 A1 | 6/2013 | Cragg | |
| 2013/0320752 A1 * | 12/2013 | Kile | B62D 55/15 305/100 |
| 2014/0001825 A1 * | 1/2014 | Hakes | B62D 55/202 305/136 |
| 2014/0091615 A1 * | 4/2014 | Knobloch | B62D 55/14 305/136 |
| 2014/0091616 A1 * | 4/2014 | Joseph Xavier | B62D 55/14 305/136 |
| 2014/0292067 A1 * | 10/2014 | Kile | B62D 55/092 305/119 |
| 2015/0314817 A1 * | 11/2015 | Hobe | B62D 55/15 305/100 |
| 2016/0031500 A1 * | 2/2016 | Renson | B62D 55/145 305/136 |

OTHER PUBLICATIONS

PCT International Written Opinion in PCT/EP2015/056909, mailed Sep. 25, 2015, 12 pages.

* cited by examiner

ROAD WHEEL

CROSS-REFERENCE TO RELATED APPLICATIONS

This application claims, under 35 USC §119(e), the benefit of U.S. Provisional Application No. 61/973,615, to Peter Hobe et al. filed Apr. 1, 2014, the contents of which is hereby incorporated by reference in its entirety.

TECHNICAL FIELD

Principles and embodiments of the presently claimed invention relate to a road wheel for use on fully or partially tracked vehicles, which are light-weight and may be integrally formed from a single piece of material or fabricated from multiple parts.

BACKGROUND

Vehicles having tracked or partially tracked running gear ride over a closed loop of interconnected links or pads. The vehicle rolls forward over the links on road wheels having rubber covered metal rims. The road wheels act as the interface between the tracks and vehicle body, and spread the weight of the vehicle over the tracks. The road wheels are connected to the vehicles body through a suspension system that helps minimize shock and vibrations. The road wheels therefore suffer from varying stresses that can cause bending and deflection particularly of the rims. These road wheels have previously been made of heavy rolled steel or aluminum to resist such stress and bending moments, but the weight of the wheels impacts cost, fuel efficiency, and transportability. Therefore, road wheels of lesser weight but comparable or greater strength and durability, which can also be easily manufactured, are sought.

SUMMARY

Principles and embodiments of the presently claimed invention relate to a road wheel comprising a mounting disc, a dish-shaped transitional wall having an outer edge, a rim with an annular cylindrical wall attached along a first rim edge to the outer edge of the transitional wall, and a stiffening flange attached to the rim along a second rim edge opposite the first rim edge, wherein the flange provides radial support to the second rim edge of the cylindrical wall to resist deflection.

Embodiments of the presently claimed invention also relate to a road wheel, wherein the transitional wall meets and joins the rim along an edge, and not at an interior section of the rim that may be approximately at the middle of the annular cylindrical wall.

Embodiments of the claimed invention also relate to a road wheel further comprising an elastomeric pad adjoining and adhering to an outer cylindrical surface of the annular cylinder wall, wherein the elastomeric pad provides a cushioned area between the road wheel and an operatively associated tread, or track pad/track segment.

Some embodiments of the road wheel may also further comprise a protruding lip extending from an inner face of the stiffening flange, an outer face of the stiffening flange, or both, where the stiffening flange is integral with and cantilevered from the rim, and the lip may be integral with and cantilevered from a face of the stiffening flange.

Principles and embodiments of the presently claimed invention also relate to a road wheel, wherein the stiffening flange is tapered, such that it may be thicker at an end attached to the rim and thinner at an unattached end, or thinner at the end attached to the rim and thicker at the unattached end. Some embodiments of the claimed invention also relate to a unitary road wheel further comprising a plurality of openings through the stiffening flange to allow passage of debris.

Embodiments of the presently claimed invention relate to a road wheel further comprising a wear ring removably attached to the transitional wall by one or more fastening devices, for example, bolts, nuts, and washers.

Principles and embodiments of the presently claimed invention also relate to a road wheel that may be made from one or more materials selected from a group consisting of a ferrous alloy, aluminum alloy, titanium alloy, magnesium alloy, plastic, fiber reinforced composite, aluminum metal matrix composite, and mixtures thereof, and wherein the wheel may be forged from a single piece of material or cast as a single piece.

In some embodiments of the road wheel, the road wheel is fabricated with a mold, a tool, machined, joined together from multiple pieces or a combination thereof, as when the road wheel is made of fiber reinforced composite, plastic or cast metal.

In one or more embodiments, the road wheel is fabricated by assembling two or more preformed components.

Principles and embodiments of the presently claimed invention also relate to a road wheel assembly for a tracked vehicle, the road wheel assembly comprising a pair of road wheels, wherein a first road wheel is an inner road wheel and a second road wheel is an outer road wheel, and wherein an outer face of the mounting disc of the outer road wheel is connected to the outer face of the mounting disc of the inner road wheel to form a recessed region between the inner and outer road wheels, wherein the recessed region is created by the configuration and dimensions of the inner and outer dish-shaped transitional walls, and configured and dimensioned to accommodate a guide on a track, and the stiffening flange of the outer road wheel and the stiffening flange of the inner road wheel form sections of increased radial thickness and strength to resist bending and/or deflection of each peripheral unsupported edge of the inner and outer rims.

Embodiment of the claimed invention also relate to a road wheel assembly, wherein a first wear ring is removably attached to the inner road wheel and a second wear ring is removably attached to the outer road wheel, and the wear rings are made of a material that has greater wear resistance than the material(s) used for the inner and outer road wheels, for example hardened and/or alloyed steel, and wherein a stud may be press-fit into the wear ring, a female threaded insert may be press-fit into the wear ring, or a blind fastener threaded into the transitional wall or rim or into a threaded insert affixed to the transitional wall or rim.

Principles and embodiments of the presently claimed invention also relate to a road wheel comprising an annular cylindrical wall having a flat outer cylindrical surface with a diameter $D_1$, and inner surface, a wall thickness $T_1$, wherein the wall thickness may vary, a first edge with a first edge face, a second edge with a second edge face opposite the first edge face, and a width $W_1$ between the first and second edge faces, a mounting disc having a first face, wherein the first face is flat and the first face has an outer diameter $D_2$, and a second face opposite the first face, and a wall thickness $T_2$ between the first face and the second face, a transitional wall having a thickness $T_4$, wherein the transitional wall joins an outer edge of the mounting disc and first edge of the cylindrical wall, and functionally connects the mounting disc to the annular cylindrical wall, wherein the transitional wall provides radial support to the first edge of the cylindrical wall, and a stiffening flange integral with the second edge of the cylindrical wall, and opposite the transitional wall, having an inner diameter $D_3$, an inner face, and inner edge, and a wall thickness $T_3$, wherein the wall thickness $T_3$ may be uniform, greater at the inner edge extending along the inner diameter, or greater at the outer edge joined to the cylindrical wall, the stiffening flange provides radial support to the second edge of the cylindrical wall to resist deflection, and the integral mounting disc, transitional wall, cylindrical wall, and flange form the road wheel.

Embodiments of the road wheel further comprising a hole in the center of the mounting disc having a diameter $D_4$ for piloting the wheel onto a hub, and a plurality of holes forming a bolt pattern in the mounting disc for fastening a first road wheel to a second road wheel, and for mounting both road wheels to the hub.

Embodiments of the presently claimed invention also relate to a road wheel, which further comprises at least one protruding lip extending from the inner face of the stiffening flange, the outer face of the stiffening flange, or both, and wherein the thickness of the stiffening flange tapers down from the circumferential rim towards the inner diameter $D_3$.

Embodiments of the invention also relate to a road wheel, wherein the stiffening flange is offset from the second edge of the cylindrical wall by a distance $d_f$.

Embodiments of the invention also relate to a road wheel, wherein the stiffening flange tapers outwardly from the second edge of the cylindrical wall to form an outwardly sloped second edge face opposite and non-parallel with the first edge face.

Figure 9:
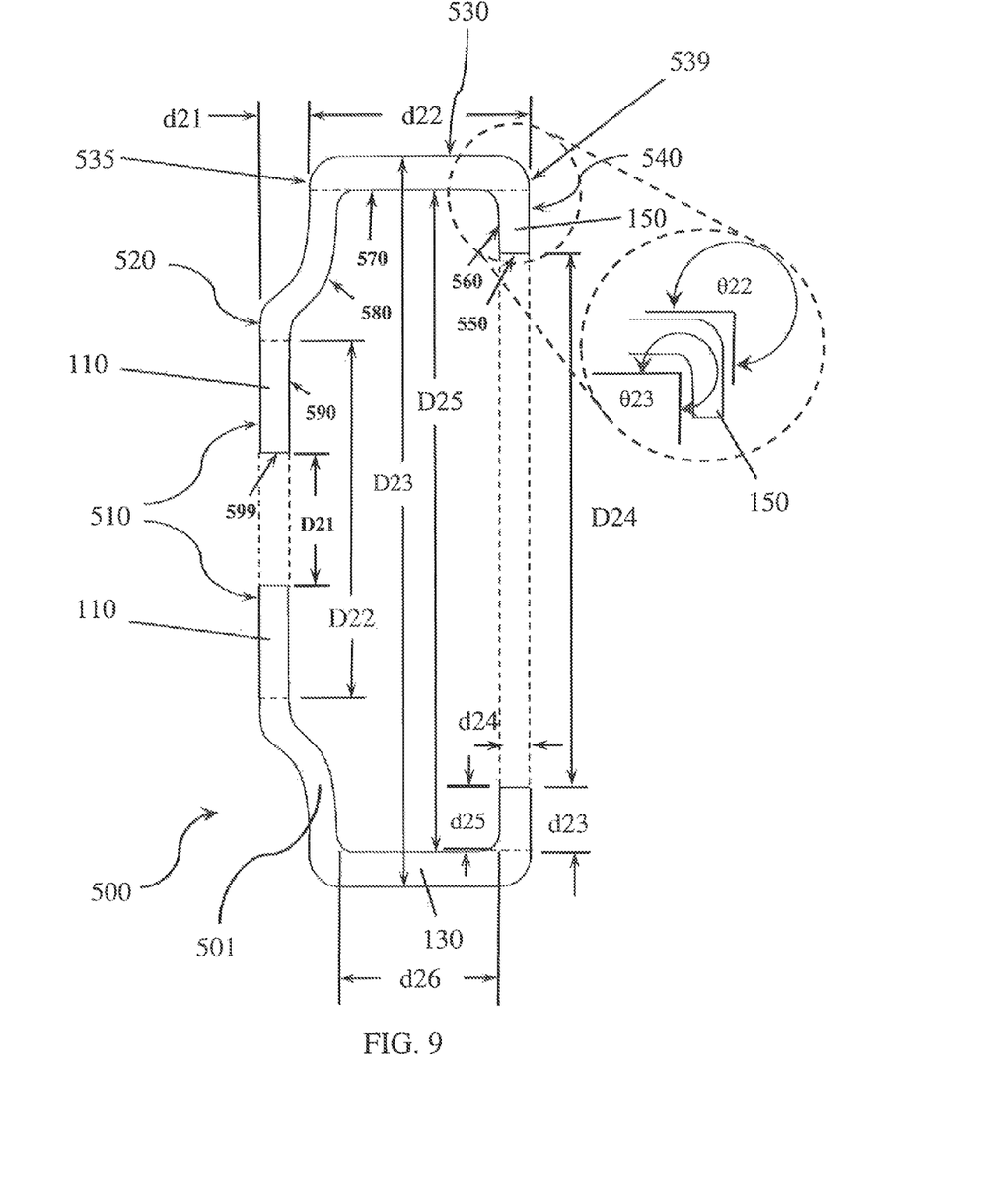
FIG. 9 illustrates a cut-away side view of an embodiment of a road wheel showing the various interconnecting sections and surfaces.

Principles and embodiments of the presently claimed invention also relate to a lightweight road wheel 500 made from a single piece of material 501 having a continuous surface, comprising a first flat outer surface 510 extending from a first inner diameter D21 to a second, outer diameter D22, a dish-shaped curved surface 520 extending from the second outer diameter D22 to a third circumferential diameter D23, a second outer surface 530 extending a distance d22 axially from the curved surface 520, wherein the curved surface 520 creates an offset distance d21 from the first flat surface 510 to a beginning edge 535 of the second outer surface 530, wherein the second surface defines a rim 130 of the road wheel 500, and a third outer surface 540 extending from the trailing edge 539 of the second outer surface 530 having a circumferential diameter between D23 and D25 to an inner diameter D24, a distance d23 at an angle θ22 from the second surface, a fourth outer surface 550 extending a distance d24, a first inner surface 560 at an angle θ23 from the second surface, extending a distance d23, which may be less than distance d23 of the third outer surface 540 towards the second outer surface 530, a plurality of connected openings formed in the third outer surface 540 and first inner surface 560, and a second inner surface 570 approximately parallel to the second outer surface 530 having a diameter D25 less than D23, a third inner surface 580 approximately parallel to the curved surface 520, a fourth inner surface 590 approximately parallel to the first outer surface 510, and a fifth inner surface 599 connecting the fourth inner surface 590 to the first outer surface 510 with a diameter of D21.

Principles and embodiments of the presently claimed invention also relate to a road wheel, wherein the shapes and dimensions of the continuous inner and outer surfaces are defined in a forging process or by a machining process after forging or casting the net shape, such that the road wheel is formed from a single piece of material.

Embodiments of the presently claimed invention also relate to a road wheel, wherein the third outer surface, fourth outer surface, and first inner surface define a wall of thickness d24 forming a stiffening flange, wherein the thickness of the stiffening flange may vary from diameter D24 to diameter D25.

Embodiments of the presently claimed invention also relate to a road wheel, wherein the first inner surface is separated from the third inner surface by a distance d26 less than d22, which defines an interior space adjacent the second inner surface, and wherein the first inner surface of the stiffening flange does not connect to the third inner surface, and the first and third inner surfaces do not form an enclosed volume.

Embodiments of the presently claimed invention also relate to a road wheel, wherein the openings in the first inner surface are a distance d27 from the diameter D25 to allow the passage of debris from the interior space. The openings may be adjacent to the surface of the inside diameter.

Embodiments of the presently claimed invention also relate to a road wheel, wherein the curved surface meets and is connected to the second outer surface along a filleted corner, and/or wherein the curved surface meets and is connected to the second outer surface along a chamfered corner.

BRIEF DESCRIPTION OF THE DRAWINGS

Further features of the present invention, its nature and various advantages will become more apparent upon consideration of the following detailed description, taken in conjunction with the accompanying drawings, which are also illustrative of the best mode contemplated by the applicants, and in which like reference characters refer to like parts throughout, where.

DETAILED DESCRIPTION

Before describing several exemplary embodiments of the invention, it is to be understood that the invention is not limited to the details of construction or process steps set forth in the following description. The invention is capable of other embodiments and of being practiced or being carried out in various ways. These illustrations are intended as examples only and are not to be construed as limiting the disclosed road wheels to any particular structure, material, or process.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in some embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

Principles and embodiments of the presently claimed invention relate to a road wheel for use on fully or partially tracked vehicles, which are configured and dimensioned to be lighter weight than previous road wheels, while exhibiting comparable or superior strength, durability, and fatigue resistance.

In some embodiments, such road wheels may be formed from a single piece of material, for example an ingot or billet, by hot, warm, or cold forging. In other embodiments, such road wheels may be cast as a single work piece, and/or machined from a single piece of material, for example a metal or plastic. A combination of these forming and shaping processes may also be employed to produce a single unitary road wheel, without the need to join separate discrete components together through other joining methods, such as but not limited to fastening, gluing, welding, or brazing. However, joining separate discrete components together through other joining methods, such as but not limited to fastening, gluing, welding, or brazing may also be employed to produce a single road wheel.

In alternative embodiments, such road wheels may comprise multiple components bonded together. In various embodiments, a separate mounting disc may be affixed to a rim, and/or a separate stiffening flange may be affixed to a rim. Fastening, gluing, welding, or brazing can be used to affix components together. Joining separate, discrete components, for example mounting discs, rims, and stiffening flanges, together by techniques such as but not limited to mechanical fasteners, rivets, welding, brazing, or adhering, and may also be employed to reduce manufacturing costs by improving manufacturability.

Embodiments of the road wheel can have the transitional wall transition into the rim along an edge or interface where the two sections meet, and not at an interior section of the rim that may be approximately at the middle of the annular cylindrical wall. Similarly the road wheel can have the cylindrical wall of the rim transition into the stiffening flange along an edge or interface where the two sections meet. Because some embodiments may have a smooth curved surface where the sections meet, there may not be a clearly defined interface, unlike at sharp corners.

Principles and embodiments of the presently claimed invention relate to improving the resistance to deflection of an annular rim used to support the weight of a tracked vehicle, particularly from radial and lateral static and dynamic loads, including shocks and impacts.

Embodiments of the presently claimed invention relate to a road wheel comprising a flange portion to provide additional strength and stiffness to an otherwise unsupported or cantilevered end of a road wheel rim. The stiffening flange is typically positioned at the opposite end from where a transitional wall meets the rim.

In embodiments of the presently claimed invention, the road wheel may comprise a mounting disc that provides a flat face for mating with another road wheel. The road wheel may also comprise a transitional wall that extends from the mounting disc to a rim, and a flange extending from the rim. The mounting disc can be a first portion of a vertical section of the road wheel, and a transitional wall can be a second portion of a vertical section of the road wheel. The rim can have an annular cylindrical wall attached along a first edge to an edge of the transitional wall. The terms vertical and horizontal relate to the orientation of surfaces or sections when the road wheel is in its intended, operational, upright position.

The transitional wall may be curved or angled away from the vertical plane of the face of the mounting disc to create an offset distance. This distance creates a gap of twice the offset when two road wheels are joined, where the gap is wide enough to receive a track guide. The dish-shaped transition wall is so named because of its first curved section like the bowl of a soup dish, and a second flatter section like the rim of a soup dish. While the transition wall may be referred to as dish-shaped, the term dish-shaped is intended to also encompass walls having a smoother S-shaped curve, as well as walls with minimal or no curvature that effectively form a straight angle from the mounting disc to the rim, or have a 90° angle that creates a corner and horizontal ledge between the mounting disc and rim, or any angle in between.

Examples of different embodiments of each of the various components and aspects of a road wheel as well as different embodiments of the overall road wheel assembly will now be described in more detail with reference to the figures. It should be understood that these drawings only illustrate some of the embodiments, and do not represent the full scope of the present invention for which reference should be made to the accompanying claims.

Figure 1:
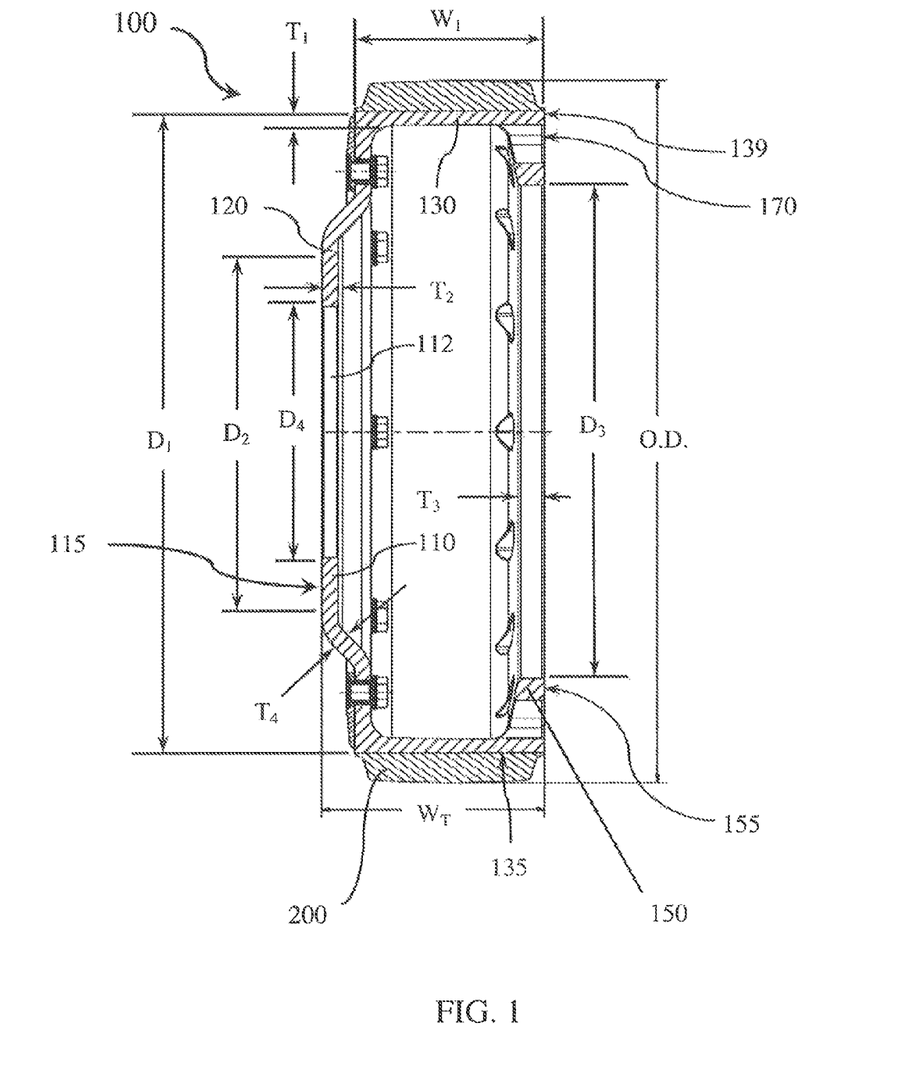
FIG. 1 illustrates a cut-away side view of an embodiment of a road wheel.

A cross-sectional view of an exemplary embodiment of a road wheel 100 in a typical upright position is illustrated in FIG. 1. The road wheel 100 has an overall outside diameter O.D. that includes the rim 130 and affixed rubber pad 200, and a total width $W_T$ from the outer face 115 of the mounting disc 110 to the opposite edge 139 of the rim or outside surface 155 of the stiffening flange 150.

The road wheel comprises a mounting disc 110, with a diameter $D_2$, which has a flat outer face 115 over at least a portion of the mounting disc 110 for meeting the mounting disc of a second road wheel. A central opening 112 in the mounting disc 110 has a diameter $D_4$ that allows the road wheel to be fitted over a hub. The mounting disc has a thickness $T_2$ that is sufficient to reliably fasten the road wheel to a vehicle suspension and provide radial support to a rim.

The road wheel further comprises a rim 130 having an annular cylindrical wall 135 that provides a suitable surface to interface with the links of a track (not shown).

A transition wall 120 joins the mounting disc 110 to the rim 130 along a first rim edge 137, so that forces are transferred from the rim to the mounting disc and suspension. The transition wall 120 has a thickness $T_4$ that may be the same or different than the thickness $T_2$ of the mounting disc. In various embodiments, the mounting disc 110 and dish-shaped transitional wall 120 may be separate components that may be joined together by mechanical fasteners, rivets, welding, brazing, gluing, and/or adhesives at a mounting disc interface 116 between mating surfaces.

Figure 4:
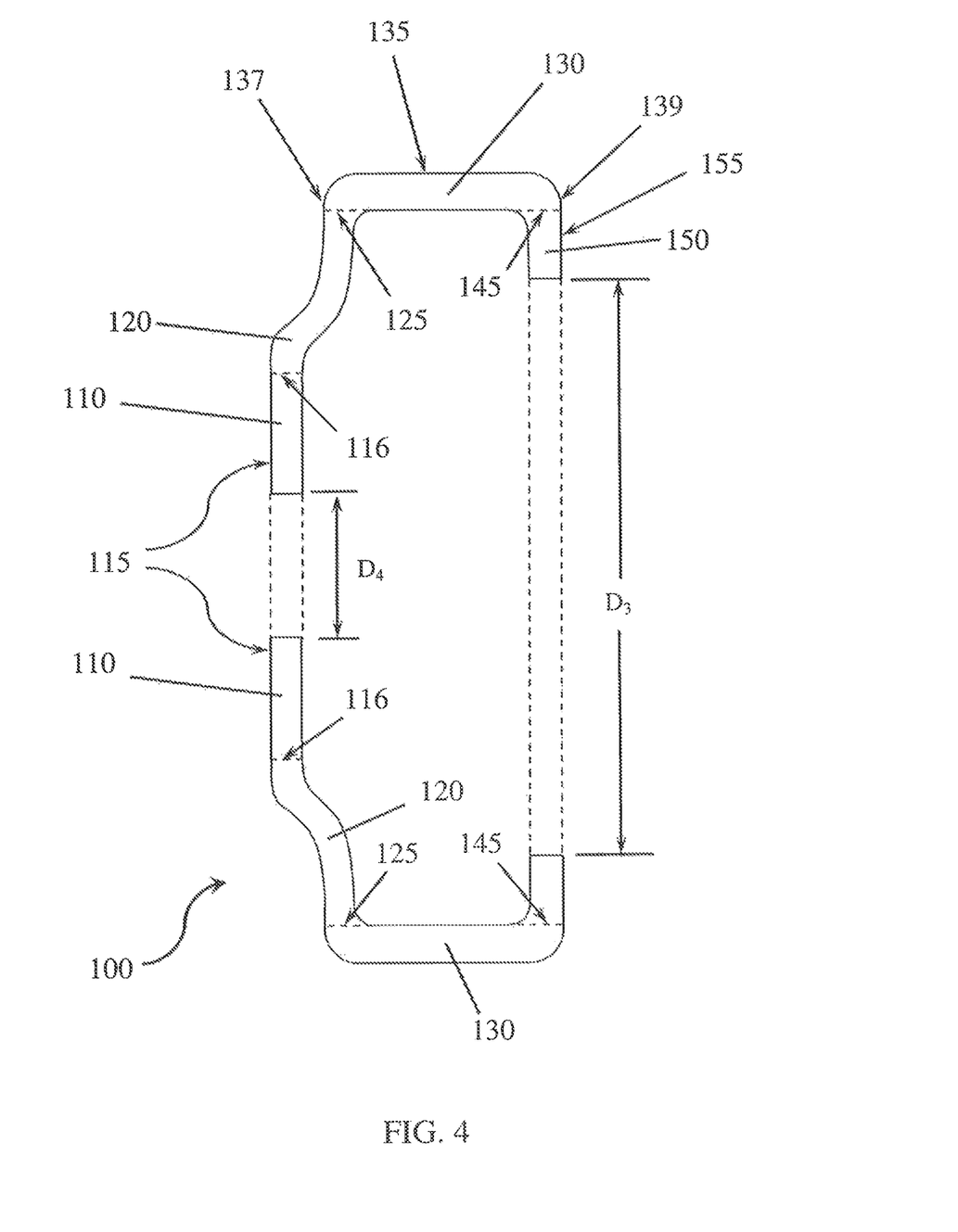
FIG. 4 illustrates a cut-away side view of another embodiment of a road wheel.

The rim has an outside diameter $D_1$. The annular cylindrical wall 135 of the rim 130 has a width $W_1$ and a thickness $T_1$. The annular cylindrical wall 135 is joined to the transition wall 120 along a first rim edge 137. In various embodiments, the annular cylindrical wall 135 may be joined to the transition wall 120 by mechanical fasteners, rivets, welding, brazing, gluing, and/or adhesives at a transition wall interface 125 between mating surfaces. In some embodiments, the transition wall 120 may join the annular cylindrical wall 135 at a distinct corner. In other embodiments, where for example the road wheel is formed from a single piece of material, for example aluminum, or there is a chamfer or fillet, there may be a smooth transition from the transition wall 120 to the annular cylindrical wall 135 without a clear interface, as shown in FIG. 4.

A stiffening flange 150 joins the annular cylindrical wall 135 of the rim 130 at a second edge 139 on the side opposite the first rim edge 137 and transitional wall 120. In various embodiments, the annular cylindrical wall 135 may be joined to the stiffening flange 150 by mechanical fasteners, rivets, welding, brazing, gluing, and/or adhesives at a stiffening flange interface 145 between mating surfaces. The stiffening flange provides radial support to the side of the rim opposite the transitional wall 120. The stiffening flange may have a uniform or tapered thickness, and an opening with a diameter $D_3$. The diameter of the opening $D_3$ on the side of the wheel with the stiffening flange is greater than the diameter of the opening $D_4$ in the mounting disc 110 and may be greater than diameter $D_2$. Openings 170 may be formed through the stiffening flange 150, and openings 124 may be formed in the transition wall 120 to allow passage of water, rocks, mud, snow, and debris out of the interior section between the stiffening flange and the transitional wall that might otherwise become trapped. These openings also contribute to the weight reduction of the design. The stiffening flange does not connect to the transitional wall or mounting disc, so an internal volume that might hold debris is not created.

Figure 5A:
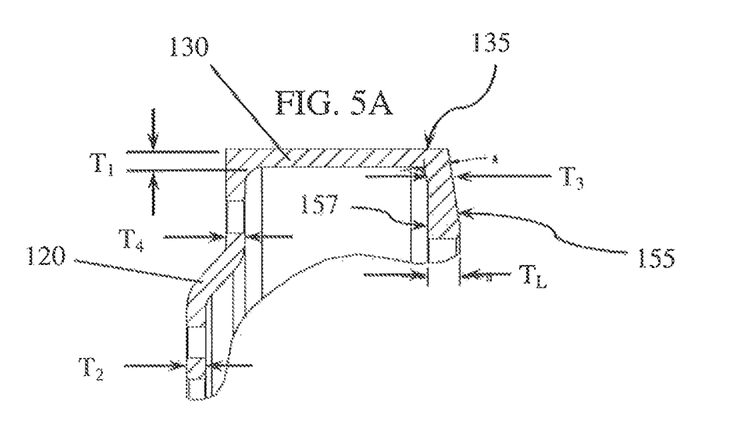
FIGS. 5A-C illustrate cut-away side views of embodiments of a road wheel with a tapered stiffening flange.
Figure 5B:
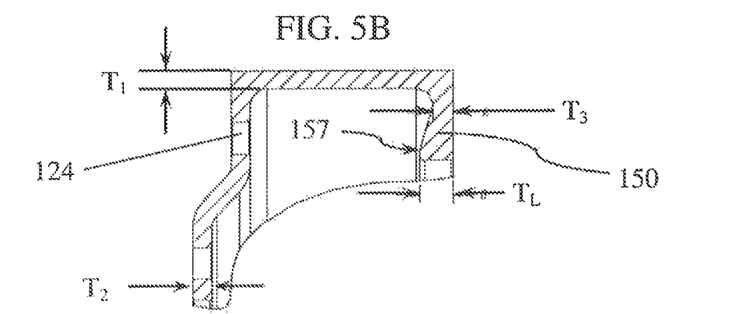
Figure 5C:
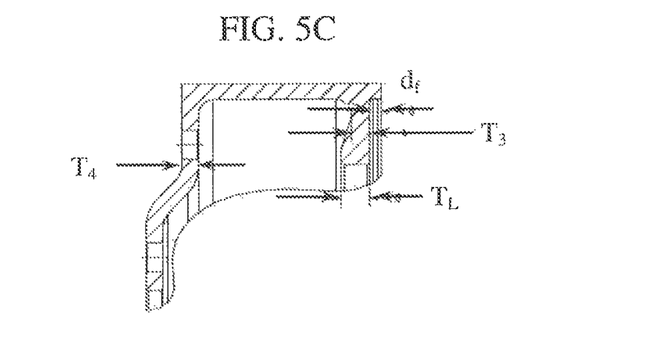

In an embodiment of a road wheel, a tapered stiffening flange 150 has an initial thickness $T_3$ that decreases to a final thickness $T_L$ less than $T_3$, as shown in FIGS. 5A-C. The exterior face or outside surface 155 is approximately perpendicular to the rim 130, whereas the interior face or inside surface 157 is angled towards the perpendicular plane of the outside surface 155, so that in the illustrated embodiment the stiffening flange narrows from the inside surface of the cylindrical wall 135 towards the distal end of the flange. In some embodiments, the stiffening flange 150 may join the annular cylindrical wall 135 at a distinct corner. In other embodiments, where for example the road wheel is formed from a single piece of material, for example aluminum, or there is a chamfer or fillet, there may be a smooth transition from the stiffening flange 150 to the annular cylindrical wall 135 without a clear interface, as shown in FIG. 4.

An elastomeric pad, for example rubber, may be affixed to the outer surface of the rim 130 to further cushion the interface between the road wheel and the track links. The inside surface of the pad is in contact with and adjoining the outer cylindrical surface of the annular cylindrical wall 135. The pad may be adhered to the rim surface through thermal bonding or the use of a suitable adhesive, or some combination thereof, as would be known in the art.

Figure 2:
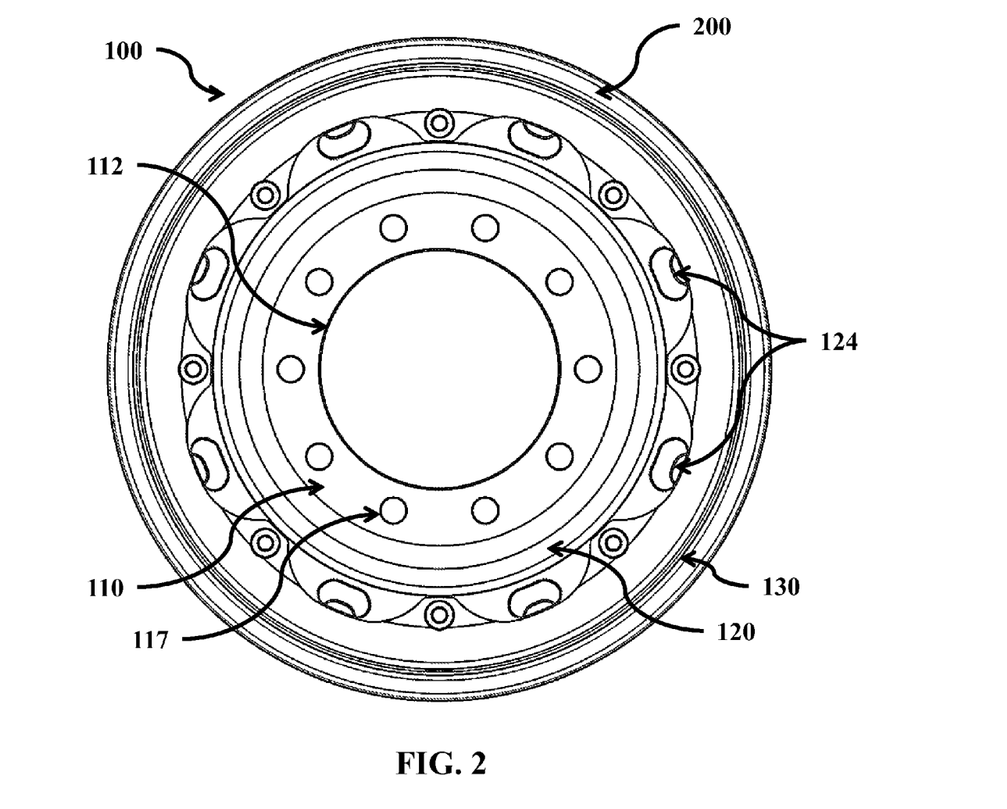
FIG. 2 illustrates a front view of the embodiment of a road wheel shown in FIG. 1.
Figure 10:
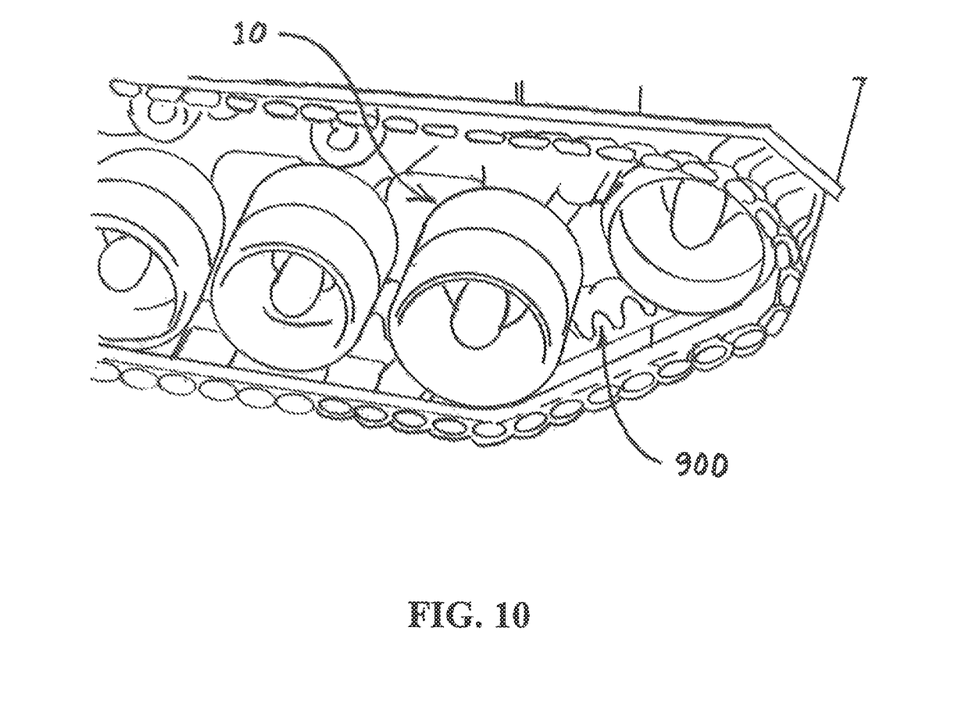
FIG. 10 illustrates an embodiment of an assembly with two joined and mounted road wheels and a track section.

FIG. 2 illustrates a front view of the embodiment of a road wheel shown in FIG. 1, and shows the positioning of the mounting disc 110, a dish-shaped transitional wall 120, and the rim 130. The central opening 112 in the mounting disc is also illustrated, as is a plurality of openings 117 arranged in a bolt hole pattern for adjoining two road wheels face-to-face. In some embodiments, a road wheel assembly 10 can be bolted together and fitted over a hub of a vehicle for mounting, as shown in FIG. 10.

In some embodiments, openings 124 may be formed through the transitional wall 120 to allow passage of water, rocks, mud, and debris out of the interior section between the transitional wall and the stiffening flange that might otherwise become trapped. These openings also serve as weight reduction features. Prior art road wheels trap debris in the 570 region without the possibility of egress resulting in added weight over time.

Figure 3:
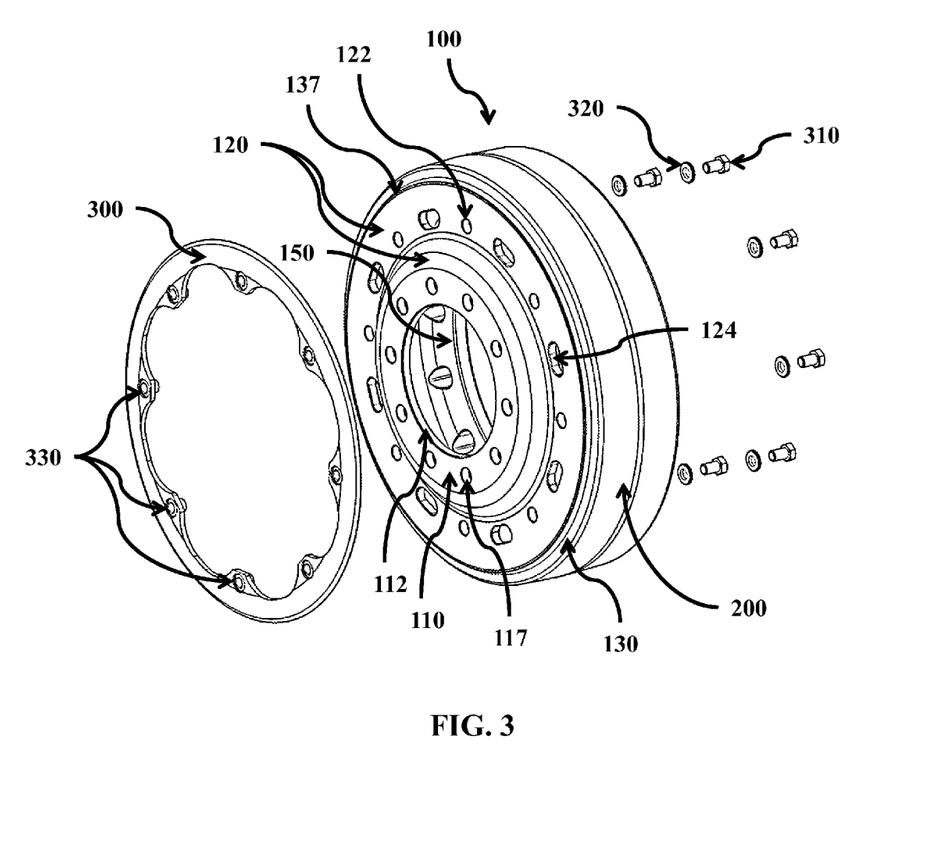
FIG. 3 illustrates a perspective view of the embodiment of a road wheel shown in FIG. 1 and a wear ring.

FIG. 3 illustrates a perspective view of the embodiment of a road wheel 100 shown in FIG. 1 and a wear ring 300. In some embodiments, the wear ring 300 may be affixed to the transitional wall 120 using fasteners 310, and optional washers 320, which pass through fastening holes 122 in the offset portion of the dish-shaped transitional wall 120. Threaded inserts 330 may be affixed to the wear ring to accept the fasteners 310. The wear ring 300 may be made of a harder and/or more wear-resistant material than the road wheel.

FIG. 4 illustrates a cut-away side view of another embodiment of a road wheel 100. The mounting disc 110 and dish-shaped transitional wall 120 are shown joining the rim 130 along a chamfered first edge 137 of the annular cylindrical wall 135. The stiffening flange 150 is also shown joining the rim 130 along a chamfered second edge 139 of the annular cylindrical wall 135. In addition, the depicted embodiment shows smooth curved transitional surfaces along the inside surfaces of the annular cylindrical wall 135, transitional wall 120, and stiffening flange 150. The wall thicknesses, therefore, vary through the transitional regions between the wall sections and the flange section.

FIG. 5A illustrate a cut-away side view of an embodiment of a road wheel with a tapered stiffening flange 150 having an initial thickness $T_3$ that increases to a final thickness $T_L$ greater than $T_3$. The interior face or inside surface 157 is approximately perpendicular to the rim 130, whereas the exterior face or outside surface 155 is angled away from the perpendicular plane, so that in the illustrated embodiment the stiffening flange tapers outwardly from the second edge of the cylindrical wall 135.

FIG. 5B illustrate a cut-away side view of an embodiment of a road wheel with a tapered stiffening flange 150 having an initial thickness $T_3$ that increases to a final thickness $T_L$ greater than $T_3$. The exterior face or outside surface 155 is approximately perpendicular to the rim 130, whereas the interior face or inside surface 157 is angled away from the perpendicular plane of the exterior face, so that in the illustrated embodiment the stiffening flange tapers inwardly from the inside surface of the cylindrical wall 135. While FIGS. 5A and 5B depict one side or the other angled outwardly, in some embodiments both surfaces may be angled to form a triangular wall.

FIG. 5C illustrate a cut-away side view of an embodiment of a road wheel with a tapered stiffening flange 150. The illustrated embodiment depicts the stiffening flange tapering inwardly from the inside surface of the cylindrical wall 135, similar to the embodiment illustrated in FIG. 5B. The exterior face or outside surface 155 is approximately perpendicular to the rim 130, whereas the interior face or inside surface 157 is angled away from the perpendicular plane of the exterior face, however the exterior face 155 of the stiffening flange 150 is indented from the outer edge of the cylindrical wall 135 by an offset distance $d_f$. This indentation creates a portion of the rim 130 which overhangs the stiffening flange by an equivalent length $d_f$. In some embodiments, the offset does not reduce the thickness of the stiffening flange 150, which still has an initial thickness $T_3$ that increases to a final thickness $T_L$ greater than $T_3$.

Figure 6A:
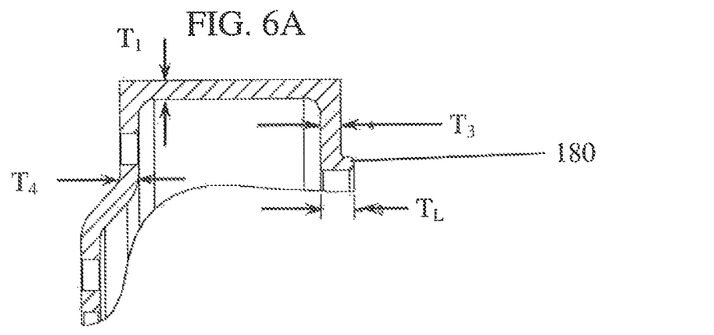
FIGS. 6A-C illustrate cut-away side views of embodiments of a road wheel with at least one lip on the stiffening flange with various orientations.

FIG. 6A illustrates a cut-away side view of an embodiment of a road wheel with one lip 180 on the stiffening flange protruding from the exterior face or outside surface 155 of the stiffening flange 150. The stiffening flange has an approximately uniform thickness $T_3$ that extends from the cylindrical wall 135 to the point at which the lip 180 begins to stick out from the outer surface 155. The thickness of the flange and lip increases to $T_L$ at the widest point. While the lip is shown having a rounded end, a flat face or other geometrical shapes are possible and contemplated within the scope of the claims.

Figure 6B:
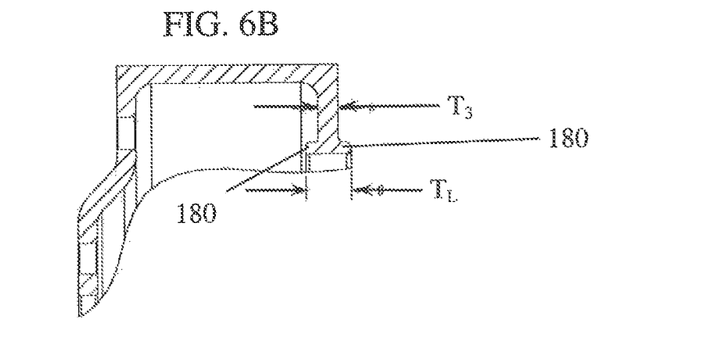

FIG. 6B illustrates a cut-away side view of an embodiment of a road wheel with two lips 180 on the stiffening flange with one lip 180 protruding from the outside surface 155 of the stiffening flange 150, and one lip 180 protruding from the inside surface 157 of the stiffening flange 150. The two lips create an I-shape that provides increased stiffening and deflection resistance to the stiffening flange 150 and rim 130. The stiffening flange has an approximately uniform thickness $T_3$ that extends approximately from the cylindrical wall 135 to the point at which the two lips 180 begin to stick out from the flange surfaces 155,157. The thickness of the flange and two lips then increases to $T_L$ at the widest point.

Figure 6C:
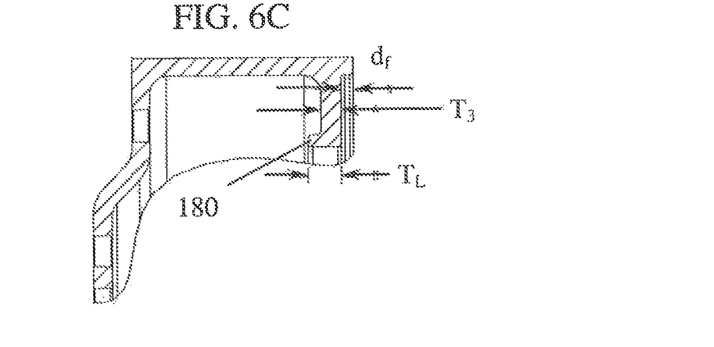

FIG. 6C illustrate a cut-away side view of an embodiment of a road wheel with a stiffening flange 150 having one lip 180 protruding from the interior face 157 of the stiffening flange 150. The stiffening flange has an approximately uniform thickness $T_3$ that extends from the cylindrical wall 135 to the point at which the lip 180 begins to stick out from the inside surface 157. The exterior face 155 of the stiffening flange 150 is indented from the outer edge of the cylindrical wall 135 by an offset distance $d_f$. This indentation creates a portion of the rim 130 which overhangs the stiffening flange by an equivalent length $d_f$.

While the particular embodiments having one or more lips have been illustrated with a stiffening flange having an approximately uniform thickness $T_3$, embodiments having a lip protruding from one or both sides of a tapered flange are also considered within the scope of the present invention.

Figure 7:
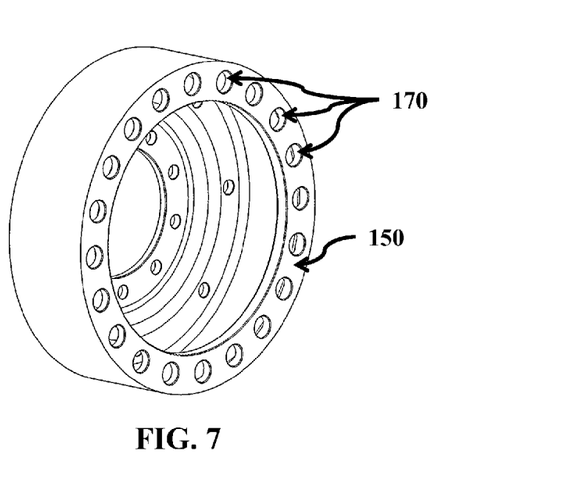
FIG. 7 illustrates a perspective view of an embodiment of a road wheel from the side with the stiffening flange.

FIG. 7 illustrates a perspective view of a road wheel from the stiffening flange side showing a plurality of openings 170 in the stiffening flange 150. The openings may be circular, oval, elliptical, hexagonal, or have other geometric shapes to allow mud, rocks, ice, and other debris to escape from the interior side of the stiffening flange 150. The transition wall 120 on the opposite side of the rim 130 may also have similar openings 124 to allow material to pass through and reduce the overall weight.

In some embodiments, there are no ribs between the annular cylindrical wall 135 and the stiffening flange 150. In some embodiments, there is no connecting surface between the transition wall 120 and the stiffening flange 150 other than the rim 130.

Figure 8A:
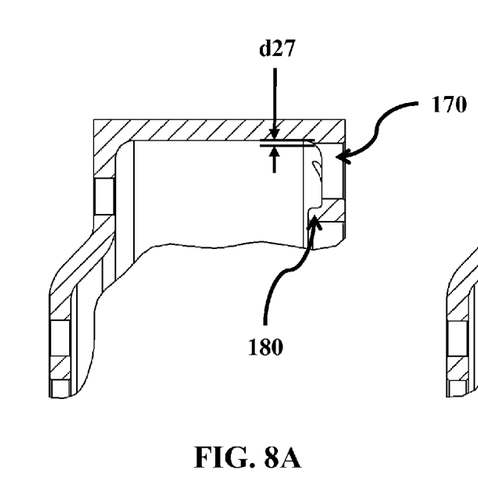
FIGS. 8A-B illustrate cut-away side views of embodiments of a road wheel with one lip on the stiffening flange.

FIG. 8A illustrate a cut-away side view of an embodiment of a road wheel with one lip on the stiffening flange and at least one debris opening of varying size, and where outer surface is approximately parallel and inline with inside diameter of 130, to permit easy egress of debris. In some embodiments, the size of the openings are sufficient for weight reduction and passage of debris.

Figure 8B:
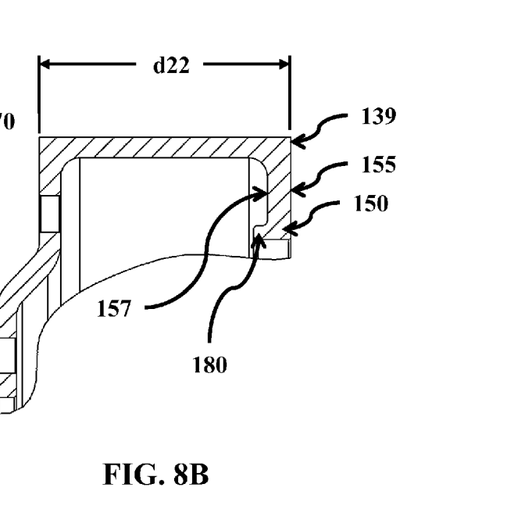

FIG. 8B illustrate a cut-away side views of embodiments of a road wheel with one lip 180 on the stiffening flange 150, and protruding from the interior face 157 of the stiffening flange 150. The stiffening flange has an approximately uniform thickness $T_3$ that extends from the cylindrical wall 135 to the point at which the lip 180 begins to stick out from the inside surface 157. In this example, the exterior face 155 of the stiffening flange 150 is flush with the second edge 139, which is an outer edge of the cylindrical wall 135, such that they meet at a sharp exterior corner.

FIG. 9 illustrates a cut-away side view of an embodiment of a road wheel showing the various interconnecting sections and surfaces, wherein the a lightweight road wheel 500 made from a single piece of material 501 has a continuous inner and outer surface, comprising a first flat outer surface 510 extending from a first inner diameter D21 to a second, outer diameter D22, a dish-shaped curved surface 520 extending from the second outer diameter D22 to a third circumferential diameter D23, a second outer surface 530 extending a distance d22 axially from the curved surface 520, wherein the curved surface 520 creates an offset distance d21 from the first flat surface 510 to a beginning edge 535 of the second outer surface 530, wherein the second surface defines a rim 130 of the road wheel 500, and a third outer surface 540 extending from the trailing edge 539 of the second outer surface 530 having a circumferential diameter between D23 and D25 to an inner diameter D24, a distance d23 at an angle θ22 from the second surface, as shown in the detailed inset, a fourth outer surface 550 extending a distance d24, a first inner surface 560 at an angle θ23 from the second surface, extending a distance d25, which may be less than distance d23 of the third outer surface 540 towards the second outer surface 530, a plurality of connected openings formed in the third outer surface 540 and first inner surface 560, and a second inner surface 570 approximately parallel to the second outer surface 530 having a diameter D25 less than D23, a third inner surface 580 approximately parallel to the curved surface 520, a fourth inner surface 590 approximately parallel to the first outer surface 510, and a fifth inner surface 599 connecting the fourth inner surface 590 to the first outer surface 510 with a diameter of D21. In some embodiments, surfaces 530 and 570 may not be parallel, such that the thickness between D25 and D23 may not be constant, but rather have a varying thickness or taper on the inside diameter. In some embodiments, the thickness between third inner surface 580 and curved surface 520 may have a varying thickness.

The first inner surface 560 is separated from the third inner surface 580 by a distance d26 less than d22, which creates an interior space adjacent the second inner surface 570, which may accumulate mud, snow, and debris.

In some embodiments, the first inner surface 560 of the stiffening flange does not connect to the third inner surface 580, and the first and third inner surfaces do not form an enclosed volume.

In some embodiments, the various surfaces may meet and be connected to an adjoining surface along a filleted or chamfered interior or exterior corner.

FIG. 10 illustrates two road wheels 100 joined together as an assembly 10 and mounted onto a vehicle, and a track section with a track guide 900 operatively engaging the road wheel assembly.

Figure 11A:
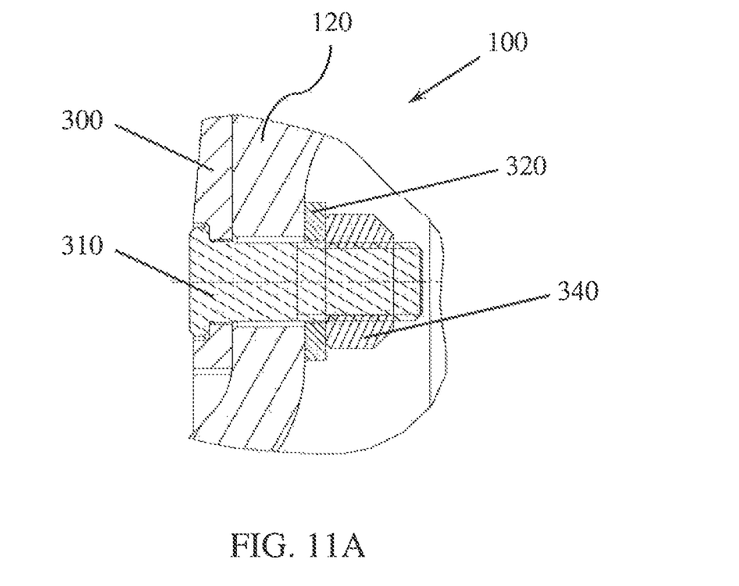
FIGS. 11A-C illustrate close up views of various embodiments comprising fasteners affixing a wear ring to a face of a transitional wall.
Figure 11B:
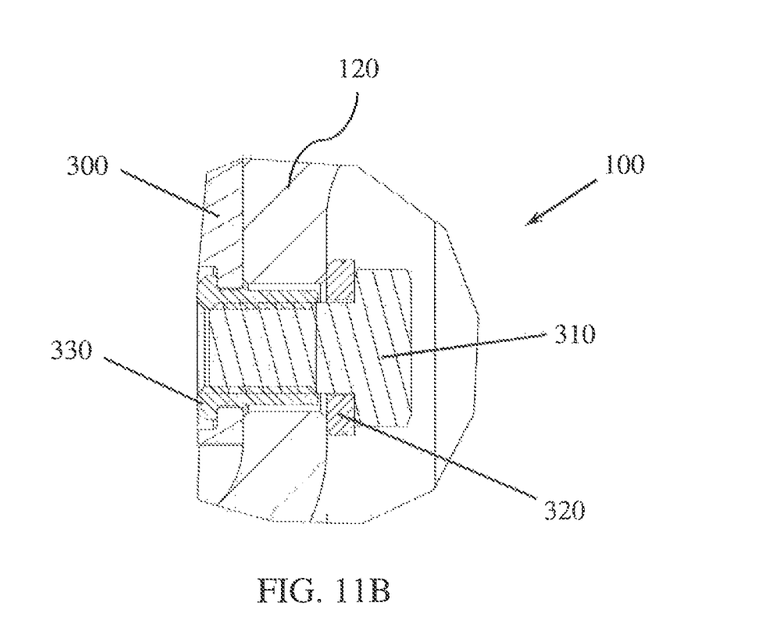
Figure 11C:
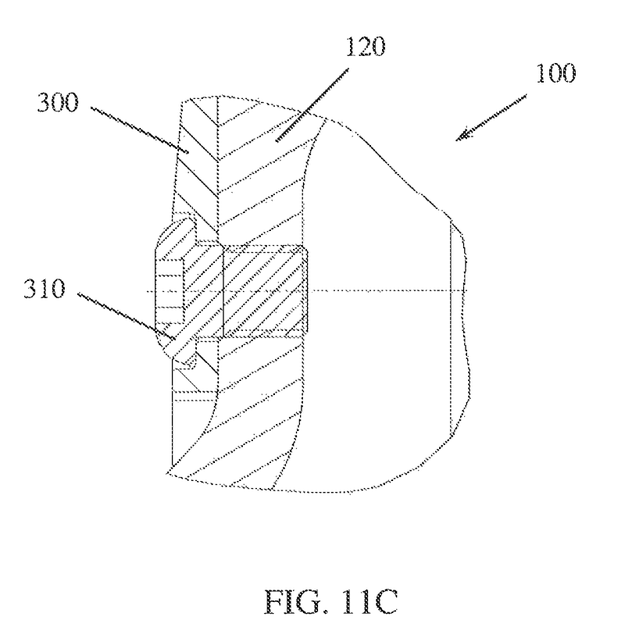

FIGS. 11A-C illustrate a close up view of fasteners 310 affixing a wear ring 300 to a face of a transitional wall 120 of a road wheel 100 with an optional washer 320. In an embodiment, the fastener may be threaded and secured to a threaded nut 340. Threaded inserts 330 may be affixed to wear ring or to the transitional wall 120 to accept fasteners 310.

In some embodiments, two road wheels are assembled together for mounting onto the suspension of a tracked vehicle. When assembled, one road wheel becomes an inner road wheel, which would be closer to the hull of the vehicle and the stiffening flange would be facing towards the vehicle; and, the other road wheel would become an outer road wheel, which would be farther from the vehicle and the stiffening flange would be facing away from the vehicle. The outer face of the mounting disc for the inner road wheel would be abutting and operatively associated with the outer face of the mounting disc of the outer road wheel. The transitional walls of the joined inner and outer road wheels form an approximately V-shaped gap or recessed region between the two wheels that is suitably dimensioned to allow a track guide 900 to pass between the road wheels. The size of the gap is determined by the offset d21 created by the transitional wall from the mounting disc to the rim.

In embodiments of the road wheel assembly, the stiffening flange of the outer road wheel and the stiffening flange of the inner road wheel form sections of increased thickness and strength to resist bending and/or deflection of each peripheral unsupported edge of the inner and outer rims, and the road wheel assembly as a whole.

The offset distance between the face of the transitional wall and the face of the mounting disc creates a gap or recessed region that is configured and dimensioned to receive a guide on the track links, when two such road wheel are mounted together.

A threaded stud is press-fit into a plurality of holes in the wear ring. Each stud is fastened to a corresponding nut with an optional washer assembled from the opposite side of the road wheel, to clamp the wear ring to the road wheel.

In some embodiments, a female threaded insert may be press-fit into a plurality of holes in the wear ring. Each insert would fasten to a corresponding bolt with optional washer assembled from the opposite side of the road wheel, to clamp the wear ring to the road wheel.

In some embodiments, a blind fastener with an optional washer is assembled through a plurality of holes in the wear ring and threads directly into the rim or into a threaded insert installed in the rim, to clamp the wear ring to the road wheel.

In one or more embodiments, a road wheel may be fabricated from two or more components joined together, whereas in other embodiments a single unitary road wheel may be formed from a single piece of metal, plastic, or composite. In various embodiments, a unitary road wheel or individual road wheel components (e.g., mounting disc, rim, transitional wall, stiffening flange, wear ring, elastomeric pad, etc.) may be fabricated by forging, metal casting, molding, stamping, machining, or a combination thereof. In one or more embodiments, the road wheel is fabricated by assembling two or more preformed components, where individual road wheel components may be assembled by joining the components together by mechanical fasteners, rivets, welding, brazing, or adhering. In various embodiments, a mold may be a casting mold for parts cast from metal, or an injection mold for plastic parts. A tool may be a cutting tool for machining or a forming tool, for example a die for forging or stamping.

Examples of different particular embodiments of each of the various aspects as well as different embodiments of the overall road wheel and assembly have been illustrated and described above. The non-limiting examples illustrate particular combinations of road wheel design features; however other combinations and arrangements of the various inventive features can be implemented, and are intended to be encompassed within the spirit and scope of the present invention. Furthermore, variations and modifications other than those illustrated and described will be apparent to persons of ordinary skill in the art. It is intended that all such embodiments, examples, variations, combinations, and modifications thereon are meant to be encompassed within the spirit and scope of the present invention as set forth in the following claims.

Every document cited herein, including any cross-referenced or related patent or application is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

What is claimed is:

1. A road wheel comprising:
   a mounting disc;
   a dish-shaped transitional wall;
   a rim with an annular cylindrical wall attached along a first rim edge to an edge of the transitional wall; and
   a stiffening flange extending from the annular cylindrical wall of the rim along a second rim edge opposite the first rim edge wherein the flange has a wall thickness that is thinner at an end and increased at a widest point and provides radial support to the second rim edge of the cylindrical wall to resist deflection.

2. The road wheel of claim 1, further comprising an elastomeric pad adjoining and adhering to an outer cylindrical surface of the annular cylinder wall.

3. The road wheel of claim 1, which further comprises a protruding lip extending from an inner face of the stiffening flange, an outer face of the stiffening flange, or both, the lip at the widest point of the flange.

4. The road wheel of claim 1, wherein the stiffening flange is tapered to be thicker at an end attached to the rim and thinner at an unattached end.

5. The road wheel of claim 1, further comprising a plurality of openings through the stiffening flange to allow passage of debris.

6. The road wheel of claim 1, further comprising a wear ring removably attached to the transitional wall by one or more fastening devices.

7. The road wheel of claim 6, wherein a stud is press-fit into the wear ring, a female threaded insert is press-fit into the wear ring, or a blind fastener is threaded into the rim or into a threaded insert affixed to the rim.

8. The road wheel of claim 1, wherein the road wheel is forged or cast.

9. The road wheel of claim 1, wherein the road wheel is fabricated with a mold, a tool, machined, joined together from multiple pieces or a combination thereof.

10. The road wheel of claim 1, wherein the road wheel is fabricated by assembling two or more preformed components.

11. The road wheel of claim 1, wherein the wheel is made from one or more materials selected from a group consisting of a ferrous alloy, aluminum alloy, titanium alloy, magnesium alloy, plastic, fiber reinforced composite, aluminum metal matrix composite, and mixtures thereof.

12. A road wheel assembly for a tracked vehicle, the road wheel assembly comprising:
   a pair of road wheels of claim 1, wherein a first road wheel is an inner road wheel and a second road wheel is an outer road wheel; and
   wherein an outer face of the mounting disc of the outer road wheel is connected to an outer face of the mounting disc of the inner road wheel to form a recessed region between the inner and outer road wheels, wherein the recessed region is created by the configuration and dimensions of the inner and outer dish-shaped transitional walls, and configured and dimensioned to accommodate a guide on a track.

13. The road wheel assembly of claim 12, wherein a first wear ring attached to the inner road wheel and a second wear ring attached to the outer road wheel are made of a material that has greater wear resistance than the material used for the inner and outer road wheels.

14. The road wheel of claim 1, wherein the stiffening flange tapers outwardly from the second rim edge of the cylindrical wall to form an outwardly sloped second edge face opposite the first edge face.

15. The road wheel of claim 1, wherein the transitional wall meets and is connected to the annular cylindrical wall along a filleted corner.

16. The road wheel of claim 1, wherein the transitional wall meets and is connected to the annular cylindrical wall along a chamfered corner.

17. A road wheel comprising:
   an annular cylindrical wall having an outer cylindrical surface with a diameter $D_1$, and an inner surface, a wall thickness $T_1$, a first edge with a first edge face, a second edge with a second edge face opposite the first edge face, and a width $W_1$ between the first and second edge faces;
   a mounting disc having outer face, wherein the outer face is flat and the outer face has an outer diameter $D_2$, and a second face opposite the outer face, and a wall thickness $T_2$ between the outer face and the second face;
   a transitional wall having a thickness $T_4$, wherein the transitional wall joins an outer edge of the mounting disc and the cylindrical wall, and functionally connects the mounting disc to the annular cylindrical wall, wherein the transitional wall provides radial support to the first edge of the cylindrical wall; and
   a stiffening flange joined to the second edge of the cylindrical wall, and opposite the transitional wall, having an inner diameter $D_3$, and a wall thickness $T_3$ extending from the cylindrical wall and a wall thickness $T_L$ at a widest point, wherein the wall thickness increases at the widest point, the stiffening flange providing radial support to the second edge of the cylindrical wall to resist deflection.

18. The road wheel of claim 17, further comprising:
   a hole in the center of the mounting disc having a diameter D4; and
   a plurality of holes forming a bolt pattern in the mounting disc.

19. The road wheel of claim 17, which further comprises at least one protruding lip at the widest point.

20. The road wheel of claim 17, wherein the stiffening flange is offset from the second edge of the cylindrical wall by a distance $d_f$.

* * * * *